W. M. READ.
RAILWAY JOINT LOCK.
APPLICATION FILED APR. 16, 1920.
1,367,832.
Patented Feb. 8, 1921.
2 SHEETS—SHEET 1
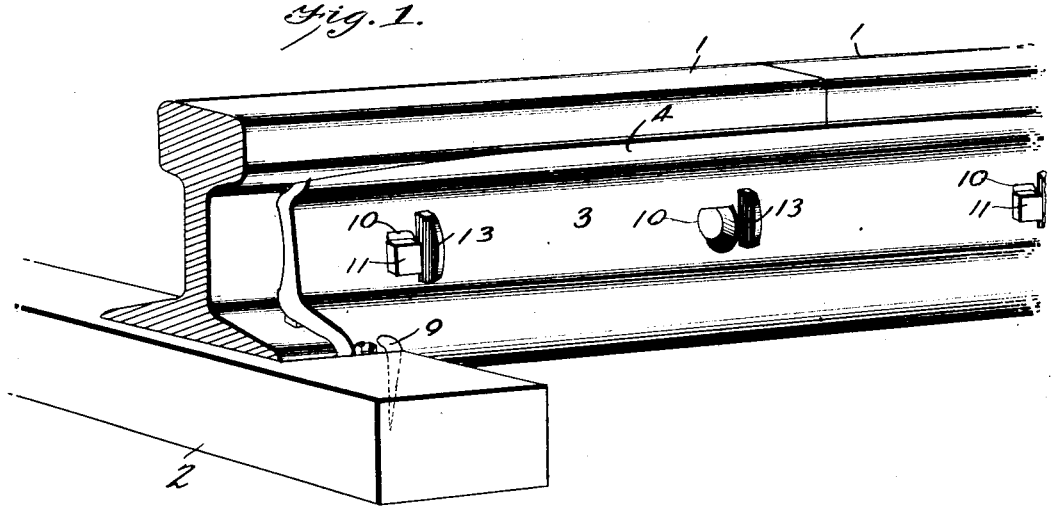
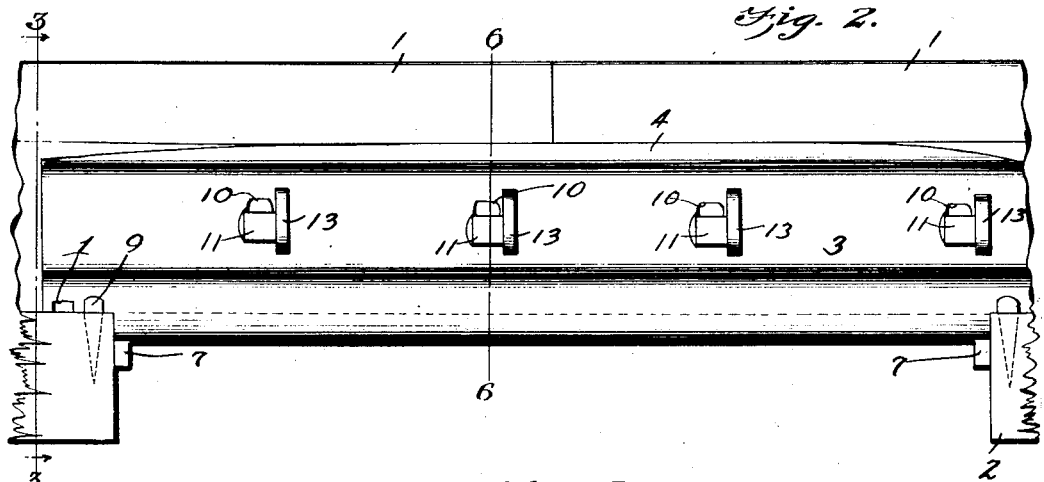
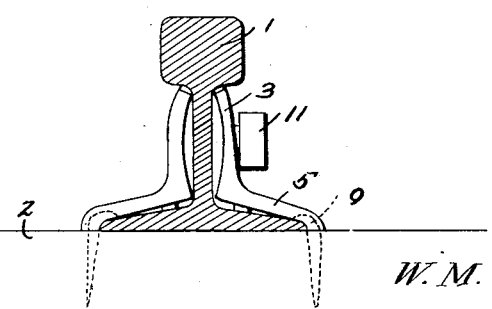
INVENTOR
W. M. READ,
BY
ATTORNEYS W. M. READ.
RAILWAY JOINT LOCK.
APPLICATION FILED APR. 16, 1920.
1,367,832.
Patented Feb. 8, 1921.
2 SHEETS—SHEET 2.
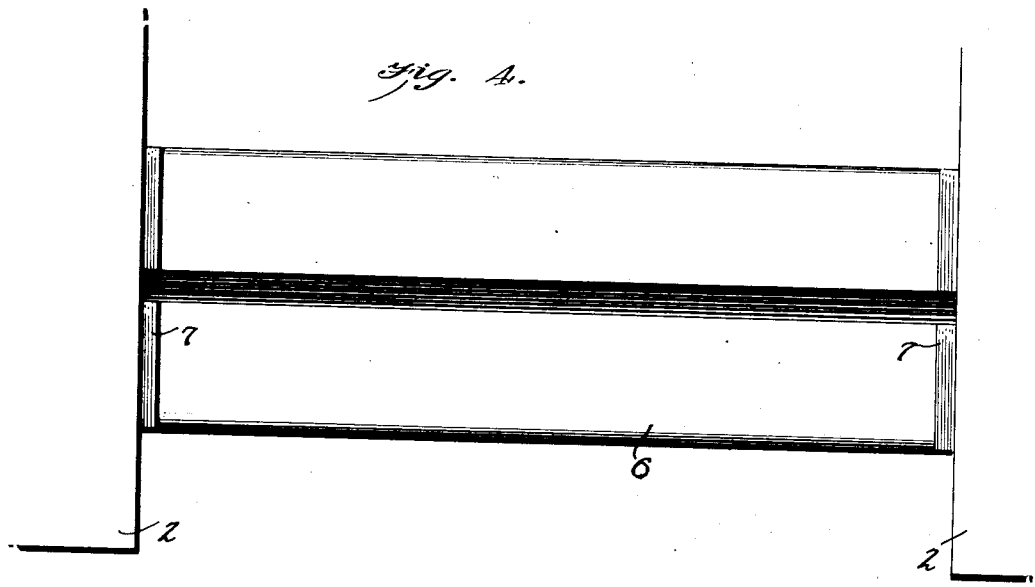
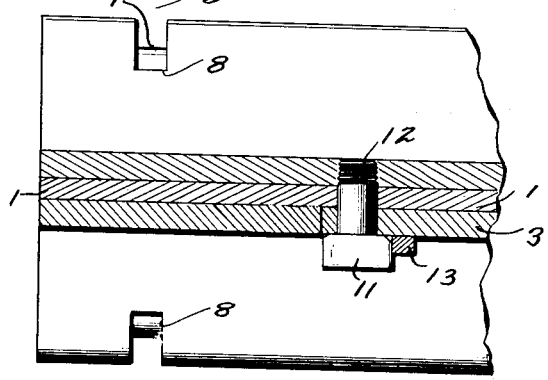
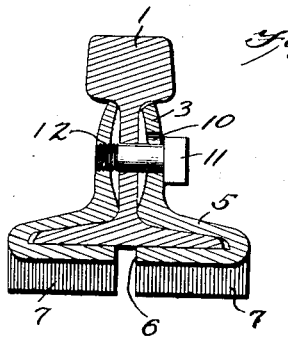
WITNESSES
INVENTOR
W. M. READ,
BY
ATTORNEYS

UNITED STATES PATENT OFFICE.

WILLIAM MARSHALL READ, OF AITKIN, MINNESOTA, ASSIGNOR OF ONE-HALF TO THOMAS ROBERT FOLEY, OF AITKIN, MINNESOTA.

RAILWAY-JOINT LOCK.

1,367,832.  Specification of Letters Patent.  Patented Feb. 8, 1921.

Application filed April 16, 1920. Serial No. 374,500.

*To all whom it may concern:*

Be it known that I, WILLIAM MARSHALL READ, a citizen of the United States, and a resident of Aitkin, in the county of Aitkin and State of Minnesota, have invented certain new and useful Improvements in Railway-Joint Locks, of which the following is a specification.

My invention is an improvement in railway joint locks, and consists in the provision of similar fish plates adapted to be arranged on opposite sides of the rails at the joints, each plate having a portion which extends inwardly beneath the rail to near the center, and has at each end of the said extending portion a downward extension for engaging the tie to prevent longitudinal movement of the plate, and wherein a new and improved means of connecting the fish plates is provided, together with other means for preventing release of the locking means.

In the drawings:—

Figure 1 is a perspective view of the improved joint,

Fig. 2 is a side view,

Figs. 3 and 6 are sections on the lines 3—3 and 6—6, respectively of Fig. 2,

Fig. 4 is a bottom plan view,

Fig. 5 is a horizontal section at the level of the holding bolts.

In the present embodiment of the invention, the rails 1 which are supported by the usual ties 2 are connected by similar fish plates at their abutting ends. Each of these plates consists of a portion 3 which fits against the web of the rail, and has an extension 4 at its upper edge abutting the underface of the tread, a portion 5 overlying the base flange at the adjacent side, and a portion 6 which extends beneath the base flange to near the center of the rail.

Each of these portions 6 is provided at each end with a depending flange or rib 7, which is adapted to engage a tie 2 to prevent movement of the fish plate longitudinally of the rail. The connections between the portions 5 and 6 of the plates are notched as indicated at 8 near their ends, for permitting the passage of spikes 9 which hold the fish plates and rails to the tie.

Referring to Fig. 1, it will be noticed that the extension 4 is of greatest height at the center of the fish plate and gradually decreases in height toward the ends of the fish plate. Thus the highest portion of the extension, and of the fish plate, is at the abutting line beneath the rail.

The body portion 3 of each fish plate is provided with openings 10 for receiving screw bolts 11 which pass through openings in the web of the rail ends registering with the openings 10, and engage threaded openings 12 in the opposite fish plate. These openings as will be seen by reference to Figs. 1, 2 and 6, are of greater depth than the diameter of the bolt which they are to receive, so that a limited motion will be permitted between the bolt and the fish plate in a vertical direction.

The bolts are passed through the openings 10, and through the openings in the web of the rail, into engagement with the threaded openings of the opposite plate, and there is provided an integral bar or lock 13 at each opening 10 for engaging the head of the screw bolt 11 to prevent turning of the said bolt. The fish plates are connected by four bolts, two for each rail end, and the said bolts have square heads.

These openings 10 are also of greater diameter horizontally than the bolt which they are to receive, so that the fish plate can move longitudinally of the rail with respect to the bolt within limits. In placing the fish plates the bolts 11 are placed, with the fish plate on the outside of the rail moved far enough to the right of Fig. 1, to permit the heads of the bolts to turn. After the bolts have been turned as tight as they can be turned, the fish plate on the outside of the rail is driven slightly to the left, far enough so that the ribs 13 will engage the heads of the bolts, and lock said bolts from turning. Now when the spikes 9 are placed, the fish plates on the outside of the rail can not move in a direction to release the bolt heads, and all of the said heads are locked from turning movement into released position.

The spikes must be drawn and the outer fish plate moved to the right of Fig. 1 before the bolts 11 can be released. Notches 8 are so cut that the head of the spike may pass down through these notches into close engagement with the base flange of the rail, as will be evident from an inspection of Fig. 5.

As is known, the rails tend to travel with the moving train, and so strong is this tendency that in soft marshy places the rail cuts the spike, which must be replaced at frequent intervals. If not cut, they are loosened in the tie by the intermittent motion. The ribs 7 at the ends of the fish plates prevent this trouble, by their engagement with the ties, taking the strain off the spike.

Some space is provided between the edges of the base flanges and the connection between the portions 5 and 6 of the plates, so that when the extension 4 wears down in the center, the fish plates may be driven up closer to the rail, and again spiked. The opening 10 referring to the central portion of Fig. 1, it will be seen, is cut out below the bolt, so that this driving up motion is permitted.

I claim:

1. A rail joint lock comprising fish plates adapted to fit against the webs of the rail ends at the opposite sides thereof, each of the fish plates having openings registering with those of the rail webs, the openings of one plate being threaded, a bolt passing through each set of registering openings and having threaded engagement with the openings of the last named fish plate, the fish plate adjacent to the heads of the bolts having ribs adapted to abut a face of the bolt head to prevent turning thereof, the openings of the said plate for the bolt being elongated to permit longitudinal movement of the fish plate to cause the ribs to simultaneously engage the heads of the bolts, said last named fish plate having notches at its outer edge for engagement by spikes to hold the fish plate from movement toward release position of the bolts.

2. A rail joint lock comprising fish plates adapted to fit against the webs of the rail ends at the opposite sides thereof, each of the fish plates having openings registering with those of the rail webs, the openings of one plate being threaded, a bolt passing through each set of registering openings and having threaded engagement with the openings of the last named fish plate, the fish plate adjacent to the heads of the bolts having ribs adapted to abut a face of the bolt head to prevent turning thereof, the openings of the said plate for the bolt being elongated to permit longitudinal movement of the fish plate to cause the ribs to simultaneously engage the heads of the bolts.

3. A rail joint lock comprising a pair of fish plates adapted to engage the webs of the rail and having openings registering with those of the rail webs, the openings of one plate being elongated to permit the plate to move longitudinally with respect to the bolts, and said plate having locking ribs for abutting faces of the bolt heads when the plate is moved longitudinally toward the bolts to lock said bolts from turning.

WILLIAM MARSHALL READ.